Jan. 13, 1959

C. A. CLARK 2,868,167

MILKING AND WEIGHING APPARATUS

Filed July 22, 1957

INVENTOR.
CLARENCE A. CLARK
BY
Horace B. VanValkenburgh
ATTORNEY

Jan. 13, 1959     C. A. CLARK     2,868,167
MILKING AND WEIGHING APPARATUS
Filed July 22, 1957     2 Sheets-Sheet 2
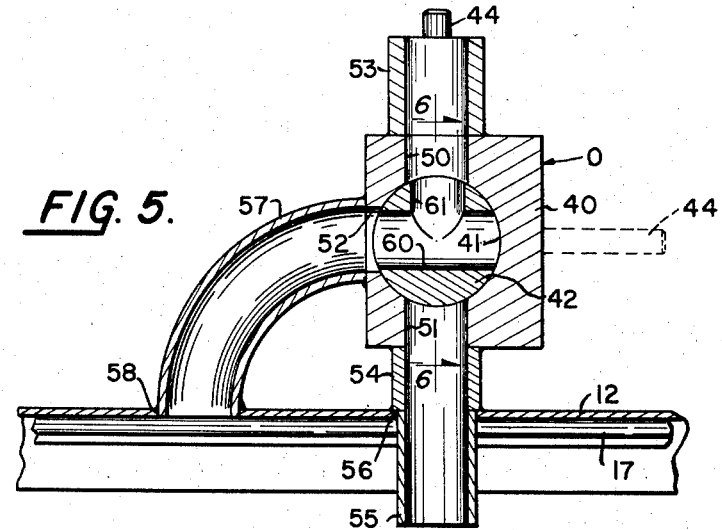
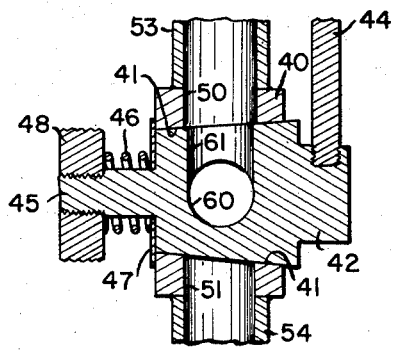
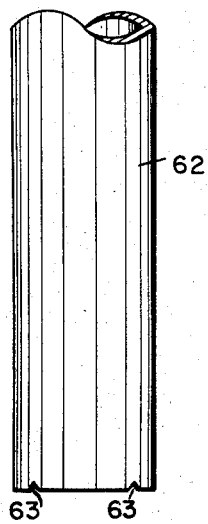
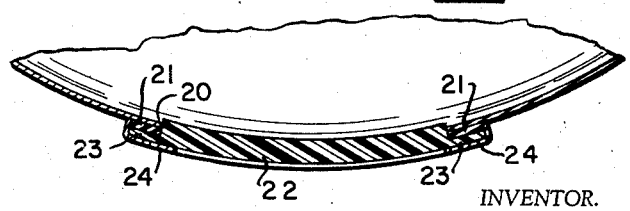
INVENTOR.
CLARENCE A. CLARK
BY 2,868,167
MILKING AND WEIGHING APPARATUS
Clarence A. Clark, Lafayette, Colo.
Application July 22, 1957, Serial No. 673,305
11 Claims. (Cl. 119—14.05)

This invention relates to apparatus for milking and weighing milk, and more particularly to such apparatus which may be utilized as part of a milking machine, in order that the milk production of each cow, in turn, may be weighed before being sent to storage.

Previously, milk pails have been used which could be suspended from a scale, so that the milk from an individual cow could be weighed, but these required either emptying the contents of the pail into a storage tank, or draining the pail into a storage tank. Thus, each weighing and discharge operation consumed an undue amount of time, as well as sometimes undue effort. In addition, unduly complicated apparatus is difficult to maintain clean and to sterilize, while adequate sterilization is a necessity in order to produce pure, wholesome milk.

Among the objects of the present invention are to provide a novel apparatus for milking and weighing milk; to provide such apparatus which may be readily emptied into a storage tank or the like; to provide such apparatus which includes a receptacle which may be suspended from or mounted on a scale, but need not be removed from the scale; to provide such apparatus which includes a receptacle which may be emptied, after weighing, while a milking device is being connected to the next cow, and also in which difficulties due to air are avoided; to provide such apparatus which includes a receptacle and associated parts which are readily cleaned and sterilized; to provide such apparatus which includes a receptacle in which the quality of milk may be observed; to provide such apparatus from which samples of milk may readily be obtained for testing purposes; to provide such apparatus in which a relatively simple arrangement of valves may be utilized to fill and empty the receptacle, without the necessity for stopping and starting suction or discharge pumps and the like; and to provide such apparatus which is relatively simple to construct yet is effective in operation.

Additional objects and the novel features of this invention will become apparent from the description which follows, taken in connection with the accompanying drawings, in which:

Fig. 5 is an enlarged, fragmentary vertical section taken along line 5—5 of Fig. 2;

Fig. 6 is a fragmentary, vertical section taken along line 6—6 of Fig. 5;

Fig. 7 is an enlarged fragmentary view of the lower end of a suction pipe forming a part of the apparatus of Figs. 1–3; and Fig. 8 is an enlarged, fragmentary horizontal section taken along line 8—8 of Fig. 1.

Figure 1:
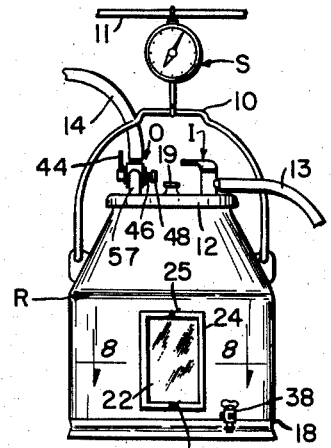
Fig. 1 is a side elevation of apparatus constructed in accordance with this invention.

As illustrated in Fig. 1, apparatus constructed in accordance with this invention may comprise a receptacle R, provided with a bail or handle 10 by which the receptacle may be suspended from a scale S, in turn suspended from a suitable support 11, although the receptacle may be associated with a scale in any other suitable manner, as by resting on a platform scale. The receptacle R may be provided with a top 12, on which may be mounted an inlet valve I and an outlet valve O, the former being connected to a suction hose 13 leading from a milking device which may be connected to a series of cows, in turn, and the latter to a hose 14 leading to a suction pump and a storage receptacle. The receptacle R remains associated with or suspended from the scale S at all times during milking, the scale S being adjusted so that the weight of the empty receptacle R and the hoses attached thereto will give a zero reading, so that, as each cow is milked, the individual output of the cow may be weighed, before the milk is sent to storage. However, the suction provided by hose 14 will operate the milking device connected to hose 13, in a manner described later, while the top 12 is held on the receptacle R by suction, which is exerted in the interior of the receptacle R during the entire milking period.

The receptacle R and its top 12, as well as valves I and O, may be made of a suitable material, such as stainless steel, a pyrex glass or plastic which will withstand sterilization. The bottom 15 of the receptacle is conveniently flat, as shown, while the upper portion of the sides of the receptacle may taper inwardly to an upright flange 16 on which may rest a gasket 17 formed of suitable resilient material which is not subject to deterioration during sterilization, such as good quality rubber. The bottom of the receptacle R may also be provided with a protective ring 18, while the bottom and sides of the receptacle may be integral, as shown, or the bottom may be formed separately from the sides and conveniently integrally with the ring 18, or separately therefrom, if desired, with the separate parts being connected together in a suitable manner, as by welding or brazing. Also, the inside corners of the receptacle, at the bottom, may be rounded and smoothed by solder or the like.

The top 12 may be provided with a button 19, by which the top may be more readily removed from the receptacle, while at one side, an aperture 20 may be formed in the receptacle, such as rectangular, as in Figs. 1 and 8, around the edges of which a rectangular gasket 21 is engaged by a transparent pane 22, such as glass, conveniently having a peripheral flange 23, with suction inside the receptacle, through hose 14, causing gasket 21 to seal against the side wall of the receptacle and against flange 23 of pane 22. The pane 22 permits a view of the contents of the receptacle, so that the operator may observe the condition and color of milk in the receptacle. Glass pane 22 and gasket 21 are held in position by a rectangular rim 24, which may be angular in cross section and may in turn be held in position by suitable removable means, such as a pair of wing nuts 25 mounted on studs extending outwardly from the receptacle and secured thereto in a suitable manner.

Figure 4:
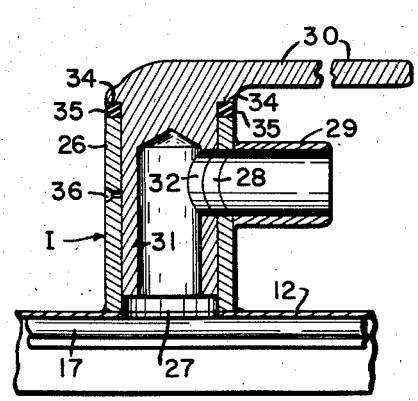
Fig. 4 is an enlarged, fragmentary vertical section taken along line 4—4 of Fig. 2.

The inlet valve I, as in Fig. 4, may include a short, upstanding tube 26, secured to top 12 at an opening 27, as by welding, and provided with a hole 28 at which a nipple 29, for connection of tube 13, may be attached, as by welding. A handle 30 may be provided with a hollow depending stem 31 adapted to fit inside tube 26 and provided with an opening 32 which, when handle 30 is turned to an appropriate position, will coincide with hole 28, as during milking of an individual cow. Around the upper end of stem 31, an annular shoulder 34 may be formed to engage a gasket 35 which is pressed against the top of tube 26 by suction inside the receptacle, from the suction tube 14. In addition, tube 26 is conveniently provided with an air bleed hole 36, such as made with a No. 52 drill and countersunk on the outside, positioned so as to coincide with opening 32 when stem 31 is turned to an appropriate position, such as 180° from the position shown in Fig. 4. Bleed hole 36 may conveniently be disposed only 90° from hole 28, if desired. As will be evident, whenever suction to milking hose 13 is not desired, handle 30 may be turned, as to 90° or 180° from the position of Fig. 4, so that opening 32 is spaced from hole 28 and coincides with bleed hole 36, thus shutting off the supply of suction to hose 13, so that the milking device can be changed to another cow. This can be done whenever the operator sees that the usual weight of milk, from that particular cow, has entered receptacle R, which may also be recorded on a chart provided for the purpose. As will also be evident, the inlet valve I is readily disassembled, merely by pulling the stem 31 out of the tube 26, when there is no suction in the receptacle R or when the top 12 thereof has been lifted off. This facilitates cleaning the parts individually and sterilizing the same.

The receptacle R may also be provided with a petcock 38 connecting with the interior of the receptacle adjacent the bottom 15, for taking a sample of the milk at any time desired, for test purposes, such as for testing the milk from an individual cow for butter fat content, bacteria count or the like.

The outlet valve O, as in Figs. 5 and 6, may include a block 40 having a transverse, tapered hole 41 extending therethrough, in which a tapered plug 42 is inserted, the plug 42 being provided with a handle 44 at one end and a threaded stem 45 at the opposite end. The plug 42 may be held in block 40 by a spring 46 engaging a washer 47, larger in outer diameter than the smaller end of hole 41, and a knurled nut 48 which is threaded onto the stem. Block 40 may be provided with three passages leading into hole 41, i. e., a top passage 50, a bottom passage 51 and a side passage 52. A nipple 53 may be attached, as by welding to the block at the position of top passage 50, for connection of suction tube 14, while a tube 54 having a reduced section 55, if desired, may be attached to the block, as by welding, at the position of bottom passage 51 and extend through a hole 56 in the receptacle top 12, being attached thereto, as by welding, at the shoulder formed at the upper end of reduced section 55. A 90° L 57 may be connected, as by welding, at its upper end to block 40, at the position of side passage 52, and at its lower end, as by welding, to receptacle top 12 at the position of a hole 58.

Figure 2:
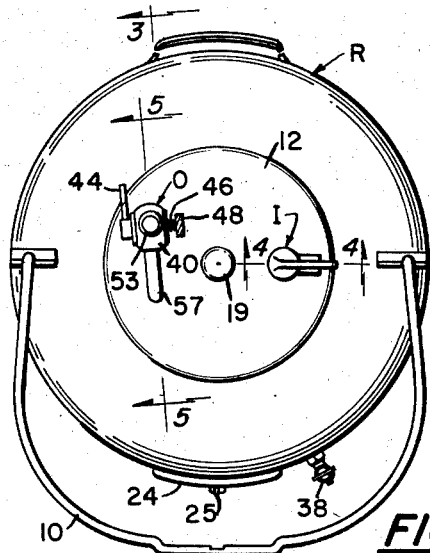
Fig. 2 is a top plan view, on a slightly enlarged scale, of a receptacle forming a portion of the apparatus of Fig. 1.
Figure 3:
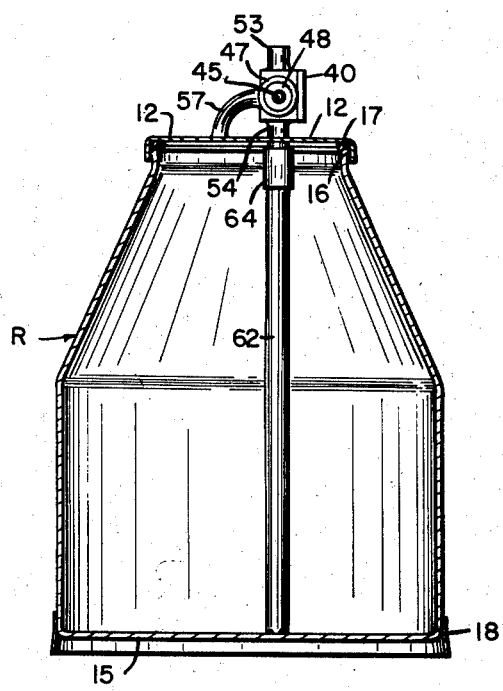
Fig. 3 is a vertical section taken along line 3—3 of Fig. 2.

Plug 42 may be provided with a transverse passage 60 and a side passage 61, the latter extending at 90° to passage 60 and intersecting the same on one side thereof. As will be evident, handle 43 may be turned to the full position of Fig. 5, so that the suction through hose 14 and nipple 53 will draw air or vapour through opening 58 from the top of receptacle R, so as to exert suction on hose 13 and withdraw milk from the cow to which the milking device is attached. This setting of the inlet valve I and outlet valve O, as shown in full in Figs. 4 and 5, is maintained as long as an individual cow is being milked. However, when one cow is finished, the inlet valve I may be shifted to shut off all suction to the cow while the milking device is being changed to another cow, but permit a slight amount of air leakage into the top of the receptacle R, through bleed hole 36, while the contents thereof are being exhausted to storage. The latter is accomplished by turning the handle 44 of the outlet valve O from the full position of Figs. 5 and 6 to the dotted position of Fig. 5, i. e., the full position of Fig. 2, in which the passages shown in full in Figs. 5 and 6 will be removed through 90° in a clockwise direction, so that the transverse passage 60 will connect top passage 50 and bottom passage 51 in the valve block 40, and the side passage 61 will face merely the blank wall of hole 41. With the outlet valve O turned to such a position, the suction through hose 14 will be exerted through reduced section 55 of tube 54 and thence through a tube 62 which may extend to the bottom of the receptacle and the lower end of which may be provided with a series of notches 63 so as to permit the lower end of the tube 60 to rest substantially on the bottom and still remove milk from the receptacle, so that the receptacle may be substantially completely drained. It will be noted that bleed hole 36 of valve I should be sufficiently small that only an amount of air will be bled into the receptacle sufficient to prevent vacuum on top of the milk interfering with complete exhaustion of milk from the receptacle, but not sufficient to cause agitation or turbulence of the milk. Also, the inner diameter of tube 62 is preferably greater than the inner diameter of tube 55, since this has been found to facilitate removal of milk from the receptacle. Tube 62 may be attached to extension 55 of tube 54 by a sleeve 64, formed of a suitable material, such as a plastic resistant to sterilization, so that the parts may be more readily separated for cleaning purposes. Or, tube 62 may be integral with or formed as an extension of tube 54.

As will be evident, while the milk is being drawn out of the receptacle R through the suction tube 14, when the handle 44 of the outlet valve O is shifted to the dotted position of Fig. 5, the operator may change the milking device connected to the end of tube 13 to another cow, and when so connected and after the contents of the receptacle R have been conveyed to storage, the outlet valve O may be reversed, as to the full position of Fig. 5, and the inlet valve I also reversed, as by shifting the handle 30 thereof to the position of Fig. 4, in which milking suction is again obtained. Thus, the milking of the next cow may proceed, the milk being automatically weighed in the receptacle R and the weight thereof observed by the operator, who may make a record thereof, before changing over to the next cow.

As will be evident, the outlet valve O may be readily disassembled for cleaning purposes, merely by unscrewing the nut 48, removing spring 46 and washer 57 from one end of the block 40 and then slipping the plug 42 out of the hole 41, from the opposite end of the block. Also, the parts of both the inlet valve I and the outlet valve O are readily assembled after cleaning and sterilization. The sight glass 22 may also be readily removed by removing the wing nuts 25 and the rim 24, after which the glass 22 and gasket 21 may be removed for cleaning purposes and sterilization. As will be evident, since suction is placed on the receptacle R during the entire milking period, a suction pump normally used to operate only the milking device can be used to move the milk into the weighing receptacle and also out of the weighing receptacle to storage. In fact, the receptacle R and associated parts may be installed in a standard milking machine merely by cutting the suction hose and attaching the severed ends to the valves O and I, respectively. Also, the changeover from milking to storage is readily effected without altering the suction or vacuum in the receptacle.

Although a preferred embodiment of this invention has been illustrated and described, it will be understood that other embodiments may exist and various changes made therein, all without departing from the spirit and scope of this invention.

What is claimed is:

1. Apparatus for milking and weighing milk, comprising a receptacle adapted to be associated with a scale, said receptacle having three openings at least adjacent the top thereof; a first valve connected with the first of said openings and provided with a connection for a milking device adapted to be attached to a cow, said valve when open permitting the transmission of a suction effect from said receptacle to said milking device through said connection; a second valve separately connected to the second and third of said openings and provided with a connection for a suction device, so as to transmit suction to the interior of said receptacle through either of said second and third openings; and conduit means extending from the second of said openings to a point adjacent the bottom of said receptacle, said second valve having one position in which a suction effect is transmitted through said third opening to the interior of said receptacle, so as to produce a suction effect at said first valve, and another position in which the suction effect is transmitted through said conduit for removal of the contents of said receptacle through the connection to said suction device.

2. Apparatus as defined in claim 1, wherein said receptacle has a top and said first, second and third openings are located in said top, said top being held on said receptacle by suction therein.

3. Apparatus as defined in claim 1, wherein said first valve is provided with a hole having a relatively small size for bleeding air into said receptacle during removal of the contents of said receptacle by suction.

4. Apparatus as defined in claim 1, wherein said receptacle is provided with an opening in the side wall thereof; sealing means adapted to engage the periphery of said side wall around said opening; and a transparent plate covering said opening and held against said sealing means by suction within said receptacle.

5. Apparatus as defined in claim 1, wherein one of said valves is provided with sealing means and the parts in engagement with said sealing means are held in sealing engagement therewith by suction in said receptacle.

6. Apparatus as defined in claim 1, wherein said conduit is provided with notches at the lower end thereof.

7. Apparatus as defined in claim 1, wherein said second valve comprises a block having separate passages connecting with said conduit and said openings in said receptacle, said block having a hole therein for a movable plug provided with passages for connecting said conduit passage with either of said passages connected to said openings.

8. Apparatus as defined in claim 7, wherein said plug is tapered and said hole therefore in said block has a corresponding shape, said plug having an extending stem at the end of smaller diameter; and resilient means associated with said stem for holding said plug in said block.

9. Apparatus as defined in claim 1, wherein said first valve comprises an upright tube having a hole in the side thereof and provided with means for attachment to said connection means; a handle having a depending hollow stem disposed within said tube and provided with a hole movable to a position coinciding with said tube hole, a shoulder being formed at the upper end of said stem; and a gasket between said shoulder and the upper end of said tube.

10. Apparatus as defined in claim 1, wherein said receptacle is provided with a removable top having an outer depending flange, said top being provided with said openings and said valves being mounted on said top; and a sealing gasket disposed between said top and the upper edge of the remainder of said receptacle.

11. Apparatus for milking and weighing milk comprising a receptacle having a bottom, upright side walls and means for suspending said receptacle from a scale; a removable top for said receptacle having an outer depending flange, said top being provided with three spaced openings and a side wall of said receptacle being provided with a rectangular opening; a gasket interposed between said top and the upper edge of the side walls of said receptacle, said top being held against said gasket by suction within said receptacle; a gasket adapted to engage the side wall of said receptacle around said rectangular opening; a transparent plate adapted to fit in said opening and having laterally extending flanges engaging said gasket, said plate being held against said gasket by suction within said receptacle; a removable rim extending around said plate for holding said plate in position; a valve including an upstanding tube secured to said top at said first opening and provided with a hole in the side thereof at a connection for a conduit adapted to be connected to a milking device for a cow and a relatively small bleed hole spaced therefrom, a laterally disposed handle provided with a cylindrical, hollow depending stem disposed within said tube and provided with a hole adapted to be moved into a position coinciding with either said hole in said tube, an annular shoulder being formed at the upper end of said stem, and a gasket interposed between said shoulder and the upper end of said tube, the suction in said receptacle maintaining the sealing relation of said gasket; a second valve comprising a block provided with a tapered, transverse central passage and three passages extending respectively upwardly, downwardly and laterally therefrom, a tubular member connecting said downward passage with said receptacle top and extending through the second hole therein, a curved conduit connecting said lateral passage with said third hole in said top, a nipple attached to said block at the position of said upward passage for connection to a conduit adapted to extend to a suction device, said suction device being adapted to maintain vacuum in said receptacle and also to remove milk from said receptacle, a tapered plug in said central block passage having at one end a handle and a shoulder adapted to engage the side of said block and at the opposite end a laterally extending, threaded stem, a washer surrounding said stem and engaging said block, a spring surrounding said stem and engaging said washer, a nut on the outer end of said stem and engaging the outer end of said spring, said plug also having a transverse passage extending therethrough and a side passage extending to said transverse passage, in one position said transverse passage being adapted to connect said downward passage with said inward passage and in another position said side passage and transverse passage being adapted to connect said lateral passage with said upward passage; a conduit extending downwardly within said receptacle to a point at or adjacent the bottom thereof and provided with notches around its lower end; and a flexible collar attaching the upper end of said conduit with the tubular member extending downwardly from said block and through said second hole in said top, said conduit being larger than said tubular member.

References Cited in the file of this patent

UNITED STATES PATENTS 1,519,827     Fuge _____ Dec. 16, 1924

FOREIGN PATENTS 561,778     Great Britain _____ June 5, 1944